United States Patent [19]
Lin

[11] Patent Number: 6,053,971
[45] Date of Patent: Apr. 25, 2000

[54] METHOD TO ACHIEVE IMPROVED ADHESION OF URETHANE ADHESIVE TO A PAINTED SURFACE

[75] Inventor: Renhe R. Lin, Waterford, Mich.

[73] Assignee: Essex Specialty Products, Inc., Auburn Hills, Mich.

[21] Appl. No.: 09/215,474

[22] Filed: Dec. 18, 1998

Related U.S. Application Data

[60] Provisional application No. 60/068,038, Dec. 18, 1997.

[51] Int. Cl.[7] .......................................... C09D 7/00
[52] U.S. Cl. ................. 106/287.23; 106/285; 156/331.7; 427/299; 427/407.2
[58] Field of Search .............................. 106/285, 287.23; 156/331.7; 427/299, 407.2

[56] References Cited

U.S. PATENT DOCUMENTS

| | | | |
|---|---|---|---|
| 4,758,648 | 7/1988 | Rizk et al. | 528/53 |
| 4,780,520 | 10/1988 | Rizk et al. | 528/53 |
| 4,857,366 | 8/1989 | Schumacher | 427/302 |
| 5,063,269 | 11/1991 | Hung | 524/296 |
| 5,238,993 | 8/1993 | Hsieh | 524/726 |
| 5,242,518 | 9/1993 | Riederer | 156/107 |
| 5,623,044 | 4/1997 | Chiao | 528/28 |

*Primary Examiner*—David Brunsman
*Attorney, Agent, or Firm*—Elisabeth T. Jozwiak; Norman L. Sims

[57] ABSTRACT

In one aspect, the present invention is a method for treatment of a painted or glass surface so as to provide improved adhesion of a urethane adhesive applied thereafter, comprising the steps of applying a pre-wipe solution to the surface, the pre-wipe solution comprising an a hydrocarbyl substituted aromatic sulfonic acid and a solvent for the acid which is soluble in the solvent; and allowing the solvent to evaporate. In a second aspect, the present invention is a pre-wipe composition comprising from about 0.5 percent to about 10.0 percent by weight of the acid and from about 90.0 percent to about 99.5 percent by weight of solvent for the acid.

18 Claims, No Drawings

METHOD TO ACHIEVE IMPROVED ADHESION OF URETHANE ADHESIVE TO A PAINTED SURFACE

CROSS REFERENCE STATEMENT

This application claims the benefit of U.S. Provisional Application Ser. No. 60/068,038.

FIELD OF THE INVENTION

The present invention relates to a method to achieve improved adhesion of a urethane sealant to a painted substrate and compositions used therefor.

BACKGROUND OF THE INVENTION

Effective bonding of glass to painted substrates is important in such industries as the automotive industry. For instance, windshields must be effectively bonded to an auto body in order to support the roof of the automobile in cases of crashes or rollovers. Typically, a urethane sealant is used to attach the glass surface to the painted surface. However, sometimes it is difficult to satisfactorily adhere urethane sealants directly to painted surfaces.

Consequently, in order to obtain acceptable levels of urethane adhesion to painted auto body surfaces, auto manufacturers often require an extra preliminary step of applying a primer coating to the painted surface before applying the adhesive. For example, U.S. Pat. No. 4,525,511, entitled "Method and Compositions for Improving Bonding to Painted Surfaces", describes such a primer and method for priming (incorporated herein by reference). Only through use of such a priming top coat can satisfactory adherence of the urethane sealant and joinder of paint-glass surfaces be achieved.

U.S. Pat. No. 4,857,366 (the '366 Patent), issued to Schumacher, entitled "Method for Obtaining Adhesion of Urethane Sealant to a Painted or Glass Surface", represents an advance in the art of glass-painted surface bonding, because the primer step was eliminated (incorporated herein by reference). The '366 Patent describes a method for treatment of a painted surface to achieve adhesion of a urethane sealant to the painted surface. The method described therein includes applying a solution of paratoluene sulfonic acid and a solvent selected from the group consisting of ketones, alcohols and aliphatic esters. However, the solvents described in the '366 Patent are relatively environmentally hazardous. Moreover, the solutions described in the '366 Patent often leave an unsightly acid residue on the treated surface, thereby adversely affecting the gloss of certain types of paint.

It would be an advance in the adhesives and sealants art to provide a method and composition for treating a painted surface which can efficiently improve adhesion between the urethane sealant and the painted surface. It would also be an advance in the art to provide a more environmentally friendly composition than the compositions described in the above prior art, and which does not leave an unsightly residue on the painted surface and does not adversely affect the gloss of the painted surface.

SUMMARY OF THE INVENTION

In one aspect, the present invention is a method for treatment of a painted or glass surface so as to provide improved adhesion of a urethane adhesive applied thereafter, comprising the steps of applying a pre-wipe solution to the surface, the pre-wipe solution comprising a hydrocarbyl substituted aromatic sulfonic acid and a solvent for the acid and allowing the solvent to evaporate.

In a second aspect, the present invention is a pre-wipe composition comprising from about 0.5 percent to about 10.0 percent by weight of the hydrocarbyl substituted aromatic sulfonic acid and from about 90.0 percent to about 99.5 percent by weight of a solvent for the acid.

The method and composition of present invention have several advantages. First of all, the methods and compositions of the present invention can employ aromatic or alkyl aromatic solvents, which are more environmentally friendly than most of the solvents described in the prior art. The compositions of the present invention do not leave a crystalline residue on the substrate surface. Finally, the compositions of the present invention will not adversely affect the gloss of certain types of paint.

DETAILED DESCRIPTION OF THE INVENTION

The method of the present invention generally includes the steps of applying a pre-wipe solution to a surface, and allowing the solvent in the pre-wipe solution to evaporate. The term "pre-wipe" is used herein to mean that the solution is applied to the surface before any adhesives or sealants are applied thereto. In other words, the pre-wipe solution of the present invention is used to treat the surface before any subsequent compositions are applied thereto.

The pre-wipe solution contains an acid and a solvent. The acid in the pre-wipe solution must be soluble in the solvent. The acid is aromatic sulfonic acid wherein one of the aromatic moiety is further substituted with one or more hydrocarbon substituents. Further, the aromatic moiety may contain one or more sulfonic acid moieties. Preferably the substituents have 6 or greater carbon atoms. Preferably the substituent has 20 or less carbon atoms. The hydrocarbon substituents can be alkyl, aryl, alkenyl, aralkyl or alkaryl. More preferably the substituents have from about 6 to about 12 carbon atoms and most preferably about 9 to about 12 carbon atoms. The hydrocarbon substituent can contain non-hydrocarbon moieties which do not impact the function of the acid in the composition of the invention. The aromatic moiety can be any aromatic moiety which meets the criteria of the invention and is preferably benzene or naphthalene. Examples of preferred acids include dodecyl benzene sulfonic acid; dinonylnaphthalene disulfonic acid and dinonyl naphthalene sulfonic acid. Most preferably, the acid is dodecylbenzenesulfonic acid. The acid content in the pre-wipe solution is preferably at least about 0.5 percent by weight, based on the weight of the total solution, more preferably at least about 1.0 percent by weight, and even more preferably at least about 1.5 percent by weight. Preferably, the amount of acid in the pre-wipe solution is less than or equal to about 10.0 percent by weight, more preferably less than or equal to about 5.0 percent by weight, even more preferably less than or equal to about 3.5 percent by weight, even more preferably less than or equal to about 3.0 percent by weight, and most preferably less than or equal to about 2.5 percent by weight.

The solvent used in the pre-wipe solution of the present invention is any solvent which dissolves the acid and which does not interfere with the adhesion of an adhesive to a substrate or damages the coating on the surface of the substrate. Preferably the solvent is an alkyl alcohol, an aromatic or alkyl aromatic solvent. Such solvents are commonly used and include, for example, isopropyl alcohol, benzene, toluene, xylene, cumene and naphtha. The preferred classes of solvents are the alkyl aromatic solvents and the aromatic solvents. Preferably, the solvent used in the pre-wipe solution of the present invention is naphtha, which typically has the following composition: 10 percent by weight of a solution containing ethylbenzene, xylene, cumene, propylbenzene, ethyltoluene; 45 percent by weight trimethylbenzene; 40 percent by weight tetramethylbenzene; and 5 percent by weight naphthalene, as described in *Industrial Solvents*, $2^{nd}$ Ed., Reinhold Publishing Corp. (1950).

Preferably, the amount of solvent in the pre-wipe solution is at least about 90.0 percent by weight based on the total weight of the pre-wipe solution, more preferably at least about 95.0 percent by weight, even more preferably at least about 96.5 percent by weight, even more preferably at least about 97.0 percent by weight, and most preferably at least about 97.5 percent by weight. The solvent content in the pre-wipe solution is preferably less than or equal to about 99.5 percent by weight based on the total weight of the pre-wipe solution, more preferably less than or equal to about 99.0 percent by weight, and even more preferably less than or equal to about 98.5 percent by weight.

The pre-wipe solution of the present invention may be formulated by blending the components together using means well known in the art. Generally the components are blended in a suitable mixer. Such blending is preferably conducted in an inert atmosphere.

The use of the pre-wipe solution of the present invention provides improved adhesion of a urethane sealant to painted surfaces without the need to use a primer. The pre-wipe solution may be wiped, sprayed or contacted by another means onto the painted or glass surface. The pre-wipe solution only needs to be applied as a very thin layer, just enough so that the surface is just covered. More can be applied if desired, but will only result in waste.

After the pre-wipe solution is applied to the surface, the solvent is allowed to evaporate. Usually, the solvent will evaporate in from about a few seconds to about 10 minutes, depending upon the surrounding conditions.

In a preferred embodiment, the acid used in the present invention is a non-crystalline liquid at ambient conditions. Thus, such acids are used, the pre-wipe solution of the present invention does not leave any crystalline residue behind, which often results in an aesthetically unpleasant appearance. The application of large amounts of the compositions of the present invention is effective for adhesion, but results in waste. Upon drying of the compositions, urethane sealant may be applied directly to the treated surface, eliminating the need for priming the painted surface prior to application of the urethane sealant.

In a preferred embodiment, after the glass and/or painted surface is treated with the pre-wipe solution, the method of the present invention includes contacting the surface with an uncured urethane adhesive. In a more preferred embodiment, the method also includes allowing the uncured urethane adhesive to cure.

Urethane sealants are known in the art, as exemplified by U.S. Pat. Nos. 4,511,626 and 4,539,345, which are incorporated by reference herein. Suitable urethane sealants include one-part heat or moisture curable systems and two-part heat or chemically activatable polyurethane systems. The methods for treating painted or glass surfaces disclosed herein may be used for both original and replacement glass installations utilizing urethane sealants.

To apply urethane sealants, the sealant composition is applied to a substrate and the adhesive on the first substrate is thereafter contacted with a second substrate. Thereafter the adhesive is exposed to curing conditions. In a preferred embodiment one substrate is glass and the other substrate is a plastic, metal, fiberglass or composite substrate which may optionally be painted. Generally the urethane sealants are applied at ambient temperature. Preferably the sealant is formulated to provide a working time of about 6 minutes or greater, more preferably about 10 minutes of greater. Preferably the working time is about 15 minutes or less and more preferably about 12 minutes or less.

The following examples are not meant to limit the scope of the present invention. All parts and percentages are by weight unless otherwise indicated.

EXAMPLE 1

Two parts of dodecylbenzenesulfonic acid (DDBSA) are mixed with 98 parts naphtha in a glass jar. The solution is stirred at room temperature for a few minutes, such that the DDBSA is completely dissolved in the naphtha, thereby forming a 2 percent DDBSA/naphtha solution. A cheesecloth is dampened with the 2 percent DDBSA/naphtha solution and is wiped on a surface coated with cured automotive paint (Du Pont RKF45500/691R98770). The naphtha solvent flashes off in a few minutes. After the solvent flashed off, a bead of about 6.4 mm×6.4 mm of uncured, one-part moisture curable polyurethane adhesive (Betaseal 520 urethane adhesive from Essex Specialty Products, Inc.) is applied to the wiped surface. The urethane is allowed to cure at 23° C. and 50 percent relative humidity for 3 days. After cure, some urethane samples are exposed to the following environmental conditions. Test condition A, no further exposure. Test condition B, the samples were soaked for 10 days at 32° C. in water. Test condition C, the samples were exposed to 100 percent relative humidity at 38° C. for 14 days. Test condition D, the samples were exposed to 90° C. for 14 days. Adhesion of the cured sealant is determined by cutting the edge of cured beads and observing the mode of bond failure. It is desirable that the interface adhesion strength (i.e., paint-urethane or glass-urethane) be greater than the cohesive strength (within the sealant) of the adhesive itself. Therefore, when testing is performed on paint-urethane-glass joints, cohesive failure (CF) is preferable to adhesive failure. The samples all exhibited 100 percent cohesive failure. There was no deposit of acid on the substrate or noticeable degradation of the coating of the substrates.

EXAMPLES 2 TO 6

Example 1 was repeated using three different acids. In Example 2, the acid was dinonylnaphthalene disulfonic acid (Nacure 155 sulfonic acid) at 1 percent in isopropyl alcohol. In Examples 3 and 4, 1 and 5 percent, respectively, of Nacure 1052 sulfonic acid (50 percent dinonylnaphthalene sulfonic acid and 50 percent heptane) were dissolved in naphtha. In Examples 5 and 6, 1 and 5 percent, respectively, of Nacure 1053 sulfonic acid (50 percent dinonylnaphthalene sulfonic acid, 40 percent xylene and 10 percent ethylbenzene) were dissolved in naphtha. All samples were tested under conditions A, B, C and D and exhibited 100 percent cohesive features in all instances. There was no deposit of acid on the substrate visible or noticeable degradation of the coating of the substrates.

COMPARATIVE EXAMPLE 1

A bead of about 6.4 mm×6.4 mm of uncured, one-part moisture curable polyurethane adhesive (Betaseal 520 urethane adhesive from Essex Specialty Products, Inc.) is applied to a painted surface which has not been wiped with any pre-wipe solution. The urethane is allowed to cure at 23° C. and 50 percent relative humidity for 3 days. After cure, some urethane were tested according to conditions A, B, C, and D. All samples exhibited 0 percent cohesive failure (100 percent adhesive failure).

COMPARATIVE EXAMPLES 2 TO 7

Example 1 was repeated using 5 percent of the following acids in isopropyl alchohol; toluic acid, propionic acid, acetic acid, fumaric acid, benzoic acid and 2,2 bis (hydroxymethyl)propionic acid). Samples from these examples were only exposed to test condition A. The samples all exhibited 0 percent cohesive failures.

COMPARATIVE EXAMPLE 8

Example 1 was repeated using p-toluene sulfonic acid at 0.5 percent in isopropyl alcohol. After cure, the samples were tested under conditions A, B, C and D. All samples demonstrated 100 percent cohesive failure. An acid residue was left on the substrate surface and the coating was severely marred.

What is claimed is:

1. A method for treatment of a painted surface so as to provide improved adhesion of a urethane adhesive applied thereafter, comprising: applying a pre-wipe solution to the surface, the pre-wipe solution comprising a hydrocarbyl substituted aromatic sulfonic acid wherein the hydrocarbyl moiety has 6 or greater carbon atoms and a solvent which dissolves the acid; and allowing the solvent to evaporate.

2. The method of claim 1 wherein the solvent is an alkyl alcohol, aromatic solvent or alkyl aromatic solvent.

3. The method of claim 2 wherein the solvent is benzene, toluene, xylene, cumene or naphtha.

4. The method of claim 3 wherein the hydrocarbyl moiety has from about 6 to 20 carbon atoms and the aromatic ring is a benzene or naphthalene.

5. The method of claim 2 wherein the solution comprises from about 0.5 percent to about 10.0 percent by weight acid, and from about 90.0 percent to about 99.5 percent by weight solvent.

6. The method of claim 1 wherein the step of applying is performed by wiping the solution over the painted or glass surface.

7. The method of claim 1 wherein the step of applying is performed by spraying the solution over the painted or glass surface.

8. The method of claim 1, further comprising the step of:

applying an uncured urethane sealant to the surface.

9. The method of claim 8 wherein the urethane sealant is a one-part heat or moisture curable system.

10. The method of claim 8 wherein the uncured adhesive is a two-part heat or chemically activatable system.

11. The method of claim 8, further comprising:

allowing the uncured urethane adhesive to cure.

12. A pre-wipe composition comprising: from about 0.5 percent to about 3.0 percent by weight of an acid comprising a hydrocarbyl substituted aromatic sulfonic acid wherein the hydrocarbyl moiety has 6 or greater carbon atoms ; and from about 97.0 percent to about 99.5 percent by weight of a solvent which dissolves the acid.

13. The composition of claim 12 wherein the solvent is an alkyl alcohol, an aromatic or alkyl aromatic solvent.

14. The composition of claim 13 wherein the solvent is benzene, toluene, xylene, cumene or naphtha.

15. The composition of claim 13 wherein the acid is dodecylbenzenesulfonic acid, dinonyl naphthalene disulfonic acid, and dinonyl naphthalene sulfonic acid.

16. The composition of claim 12 wherein the hydrocarbon moiety has from about 6 to about 20 carbon atoms and the aromatic moiety is benzene or naphthalene.

17. The composition of claim 16 wherein the hydrocarbyl moiety is a $C_{9-12}$ alkyl moiety.

18. The composition of claim 12 comprising:

from about 1.0 percent to about 3.0 percent by weight acid; and from about 97.0 percent to about 99.0 percent by weight solvent.

* * * * *